US011809173B2

(12) United States Patent
Diehr et al.

(10) Patent No.: US 11,809,173 B2
(45) Date of Patent: Nov. 7, 2023

(54) ROBOTIC CART CONFIGURED FOR EFFECTIVE NAVIGATION AND MULTI-ORIENTATION DOCKING

(71) Applicant: Fetch Robotics, Inc., San Jose, CA (US)

(72) Inventors: Eric Diehr, San Jose, CA (US); Brian Cairl, Astoria, NY (US); Sarah Elliott, Mountain View, CA (US); Levon Avagyan, San Jose, CA (US); Rohan Bhargava, San Jose, CA (US); Russell Toris, San Jose, CA (US); John W. Stewart, III, San Francisco, CA (US); Derek King, San Jose, CA (US); Melonee Wise, San Jose, CA (US); Niharika Arora, San Jose, CA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 181 days.

(21) Appl. No.: 17/120,104

(22) Filed: Dec. 11, 2020

(65) Prior Publication Data
US 2021/0191376 A1    Jun. 24, 2021

Related U.S. Application Data

(63) Continuation of application No. 16/380,892, filed on Apr. 10, 2019, now Pat. No. 10,908,601.

(51) Int. Cl.
*G05B 19/418* (2006.01)
*B65G 1/02* (2006.01)
(Continued)

(52) U.S. Cl.
CPC ......... *G05B 19/41895* (2013.01); *B65G 1/02* (2013.01); *B65G 1/0492* (2013.01); *B65G 1/1375* (2013.01); *B66F 9/063* (2013.01); *G05D 1/0242* (2013.01); *G06Q 10/08* (2013.01); *G06Q 10/087* (2013.01); *Y10S 901/01* (2013.01)

(58) Field of Classification Search
CPC .. G05B 19/41895; B65G 1/02; B65G 1/0492; B65G 1/1375; B66F 9/063; G06Q 10/08; G06Q 10/087; Y10S 901/01; G05D 2201/0216; G05D 1/0242; G05D 1/0225
See application file for complete search history.

(56) References Cited

U.S. PATENT DOCUMENTS 9,465,384 B1 * 10/2016 Jain ................. G06Q 10/06316
9,952,589 B1 *  4/2018 Brazeau ................. B66F 9/063
(Continued)

*Primary Examiner* — Thomas Randazzo

(57) ABSTRACT

A system includes: a cart including: four legs; at least one shelf, each shelf attached to each of the legs; the cart having a generally rectangular shape, a width of the cart being longer than a length of the robot, a length of the cart being longer than a length of the robot; four wheels, each wheel attached to a different leg at a bottom of the leg, the wheels configured to roll to facilitate movement of the cart; and a robotic dock, the robotic dock comprising four docking receptacles at ninety degree angles from adjacent docking receptacles; and a robot comprising: a sensor; and a docking module, the docking module comprising retractable docking pins, each retractable docking pin configured, when extended upward, to mate with a corresponding docking receptacle, thereby securing the robot to a bottom shelf of the cart.

40 Claims, 13 Drawing Sheets

(51) Int. Cl.
  *B65G 1/04*   (2006.01)
  *B65G 1/137*  (2006.01)
  *B66F 9/06*   (2006.01)
  *G06Q 10/08*  (2023.01)
  *G05D 1/02*   (2020.01)
  *G06Q 10/087* (2023.01)

(56) References Cited

U.S. PATENT DOCUMENTS

| | | | |
|---|---|---|---|
| 2006/0210382 A1* | 9/2006 | Mountz | B60D 1/465 |
| | | | 414/498 |
| 2014/0228999 A1* | 8/2014 | D'Andrea | B66F 9/063 |
| | | | 700/214 |
| 2015/0117995 A1* | 4/2015 | D'Andrea | B66F 9/075 |
| | | | 414/812 |
| 2018/0305125 A1* | 10/2018 | Guo | B66F 9/063 |
| 2020/0254607 A1* | 8/2020 | Ejstrup Hansen | B25J 11/008 |

* cited by examiner

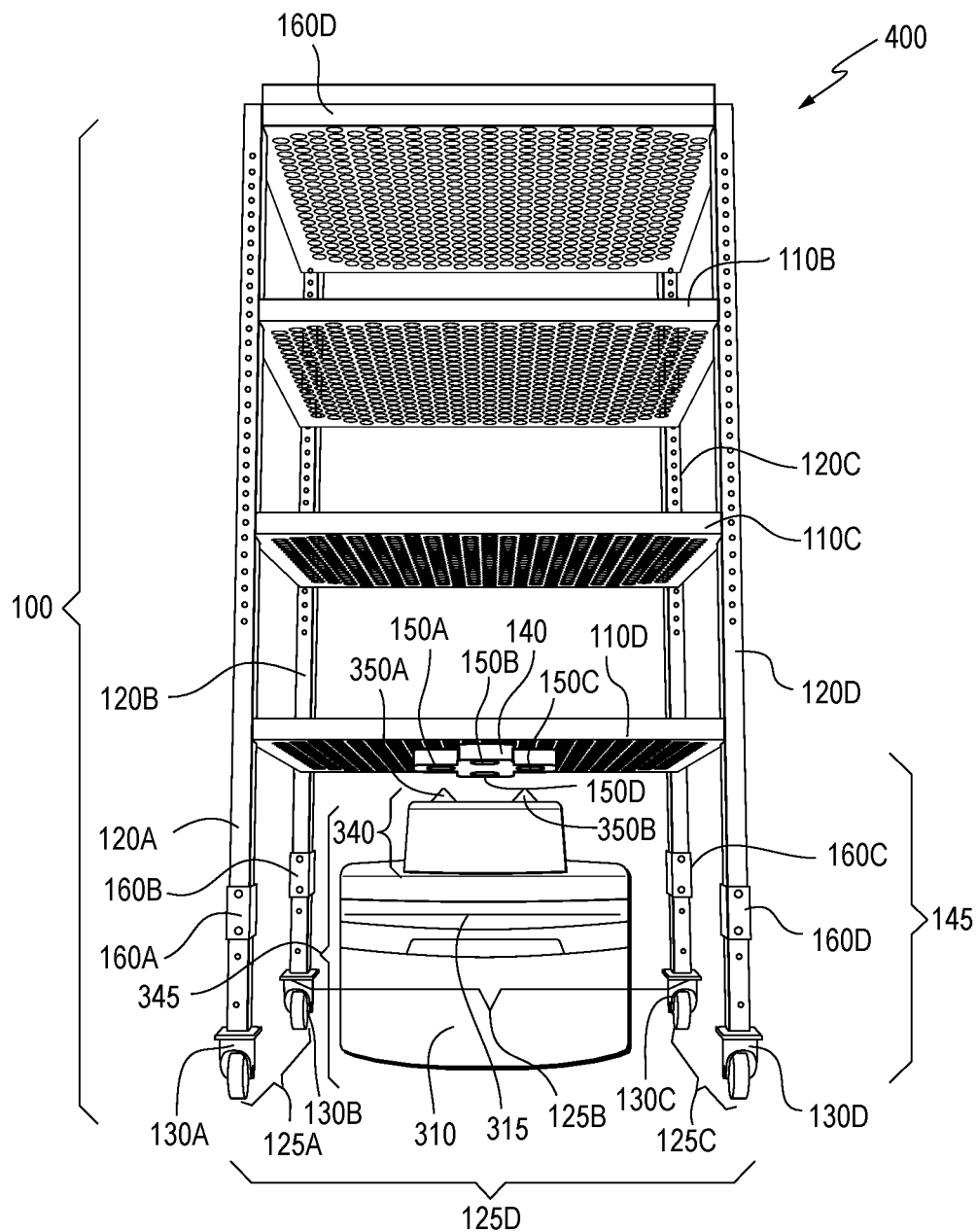

1010 — A robot comprising a sensor, the robot further comprising a docking module, the docking module comprising retractable docking pins, drives in a first direction while the robot is attached to a cart, the cart comprising: four legs; at least one shelf, each shelf attached to each of the legs; four wheels, each wheel attached to a different leg at a bottom of the leg, the wheels configured to roll to facilitate movement of the cart; and a robotic dock attached to a bottom side of a bottom shelf, the robotic dock comprising four docking receptacles at ninety degree angles from adjacent docking receptacles, each docking receptacle configured to mate with a corresponding docking pin, thereby securing the robot to the cart.

1020 — The robot, using the robotic sensor, detects that the robot is in a proper location under the cart.

1030 — The robot stops under the cart at the proper location.

1040 — The robot lowers the docking pins down into the docking module and away from the docking receptacles of the robotic dock, thereby detaching the robot from the cart.

1050 — The robot rotates under the cart to point the robot to travel in a second direction.

1060 — The robot raises the docking pins into an engaged position in alignment with the corresponding docking receptacles, thereby securing the robot to the bottom shelf and thereby securing the robot to the cart.

1070 — The robot drives in the second direction while the robot is attached to the cart.

1110 — A robot comprising a sensor, the robot further comprising a docking module, the docking module comprising retractable docking pins, drives in a direction while the robot is attached to a first cart, the first cart comprising: four legs; at least one shelf, each shelf attached to each of the legs; four wheels, each wheel attached to a different leg at a bottom of the leg, the wheels configured to roll to facilitate movement of the cart; and a robotic dock attached to a bottom side of a bottom shelf, the robotic dock comprising four docking receptacles at ninety degree angles from adjacent docking receptacles, each docking receptacle configured to mate with a corresponding docking pin, thereby securing the robot to the first cart.

1120 — The robot, using the robotic sensor, detects that the robot is in a proper location at an end of a line of second carts.

1130 — The robot stops at the proper location.

1140 — The robot lowers the docking pins down into the docking module and away from the docking receptacles of the robotic dock, thereby detaching the robot from the first cart.

1150 — The robot drives forward in the direction under the line of second carts.

ROBOTIC CART CONFIGURED FOR EFFECTIVE NAVIGATION AND MULTI-ORIENTATION DOCKING

PRIORITY CLAIM

The present application is a continuation of U.S. patent application Ser. No. 16/380,892, filed Apr. 10, 2019 and entitled "Robotic Cart Configured for Effective Navigation and Multi-Orientation Docking," which is incorporated herein by reference in its entirety.

CROSS-REFERENCE TO RELATED APPLICATIONS

This application contains subject matter that is related to the subject matter of the following applications, which are assigned to the same assignee as this application. The below-listed applications are hereby incorporated herein by reference in its entirety:

"ROBOT MANAGEMENT SYSTEM," by Dymesich, et al., co-filed herewith.

"SYSTEM AND METHOD FOR AUTOMATICALLY ANNOTATING A MAP," by Avagyan, et al., co-filed herewith.

"SYSTEM AND METHOD FOR ROBOT-ASSISTED, CART-BASED WORKFLOWS," by Cairl, et al., co-filed herewith.

SUMMARY

A robotic cart is provided. For example, a cart is configured for one or more of robotic navigation and multi-orientation robotic docking.

For example, a substantially square robotic cart is provided. For example, a square robotic cart is provided. For example, a square robotic cart is configured for one or more of robotic navigation and multi-orientation robotic docking.

A system includes: a cart including: four legs; at least one shelf, each shelf attached to each of the legs; the cart having a generally rectangular shape, a width of the cart being longer than a length of the robot, a length of the cart being longer than a length of the robot; four wheels, each wheel attached to a different leg at a bottom of the leg, the wheels configured to roll to facilitate movement of the cart; and a robotic dock, the robotic dock comprising four docking receptacles at ninety degree angles from adjacent docking receptacles; and a robot comprising: a sensor; and a docking module, the docking module comprising retractable docking pins, each retractable docking pin configured, when extended upward, to mate with a corresponding docking receptacle, thereby securing the robot to a bottom shelf of the cart.

A system includes: a cart including: four legs; four substantially square shelves, each shelf attached to each of the legs; the cart having a generally rectangular shape, a width of the cart being longer than a length of the robot, a length of the cart being longer than a length of the robot; four wheels, each wheel attached to a different leg at a bottom of the leg, the wheels configured to roll to facilitate movement of the cart; and a robotic dock attached to a bottom side of a bottom shelf, the robotic dock comprising four docking receptacles at ninety degree angles from adjacent docking receptacles, the bottom shelf having a bottom shelf height greater than a robot height of the robot; and a robot comprising: a sensor; and a docking module, the docking module comprising retractable docking pins, each retractable docking pin configured, when extended upward, to mate with a corresponding docking receptacle, thereby securing the robot to the bottom shelf of the cart, the docking module having a docking module height that is configured to approximately match a robotic dock height of the robotic dock, the robot having a horizontal cross section that is one or more of generally circular and generally square.

A method for efficient robotic reversal of direction while carrying a cart includes: by a robot including a sensor, the robot further including a docking module, the docking module comprising retractable docking pins, driving in a first direction while the robot is attached to a cart, the cart comprising: four legs; at least one shelf, each shelf attached to each of the legs; four wheels, each wheel attached to a different leg at a bottom of the leg, the wheels configured to roll to facilitate movement of the cart; and a robotic dock attached to a bottom side of a bottom shelf, the robotic dock comprising four docking receptacles at ninety degree angles from adjacent docking receptacles, each docking receptacle configured to mate with a corresponding docking pin, thereby securing the robot to the cart; by the robot, using the robotic sensor, detecting that the robot is in a proper location under the cart; by the robot, stopping under the cart at the proper location; by the robot, lowering the docking pins down into the docking module and away from the docking receptacles of the robotic dock, thereby detaching the robot from the cart by the robot, rotating under the cart to point the robot to travel in a second direction; by the robot, raising the docking pins into an engaged position in alignment with the corresponding docking receptacles, thereby securing the robot to the bottom shelf and thereby securing the robot to the cart; and by the robot, driving in the second direction while the robot is attached to the cart.

A method for efficient robotic cart transfer includes: by a robot including a sensor, the robot further including a docking module, the docking module comprising retractable docking pins, driving in a direction while the robot is attached to a first cart, the first cart comprising: four legs; at least one shelf, each shelf attached to each of the legs; four wheels, each wheel attached to a different leg at a bottom of the leg, the wheels configured to roll to facilitate movement of the cart; and a robotic dock attached to a bottom side of the bottom shelf, the robotic dock comprising four docking receptacles at ninety degree angles from adjacent docking receptacles, each docking receptacle configured to mate with a corresponding docking pin, thereby securing the robot to the first cart; detecting, by the robot, using the robotic sensor, that the robot is in a proper location at an end of a line of second carts; stopping, by the robot, at the proper location; lowering the docking pins down into the docking module and away from the docking receptacles of the robotic dock, thereby detaching the robot from the first cart; and driving forward, by the robot in the direction, passing under the line of second carts.

DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

FIGS. 4A-4C are a series of drawings showing the robot attaching to the cart using the docking module on a bottom side of a bottom shelf.

FIG. 10 is a flow chart of a method for efficient robotic reversal of direction while carrying a cart.

FIG. 11 is a flow chart of a method for efficient robotic cart transfer.

DETAILED DESCRIPTION

Figure 1:
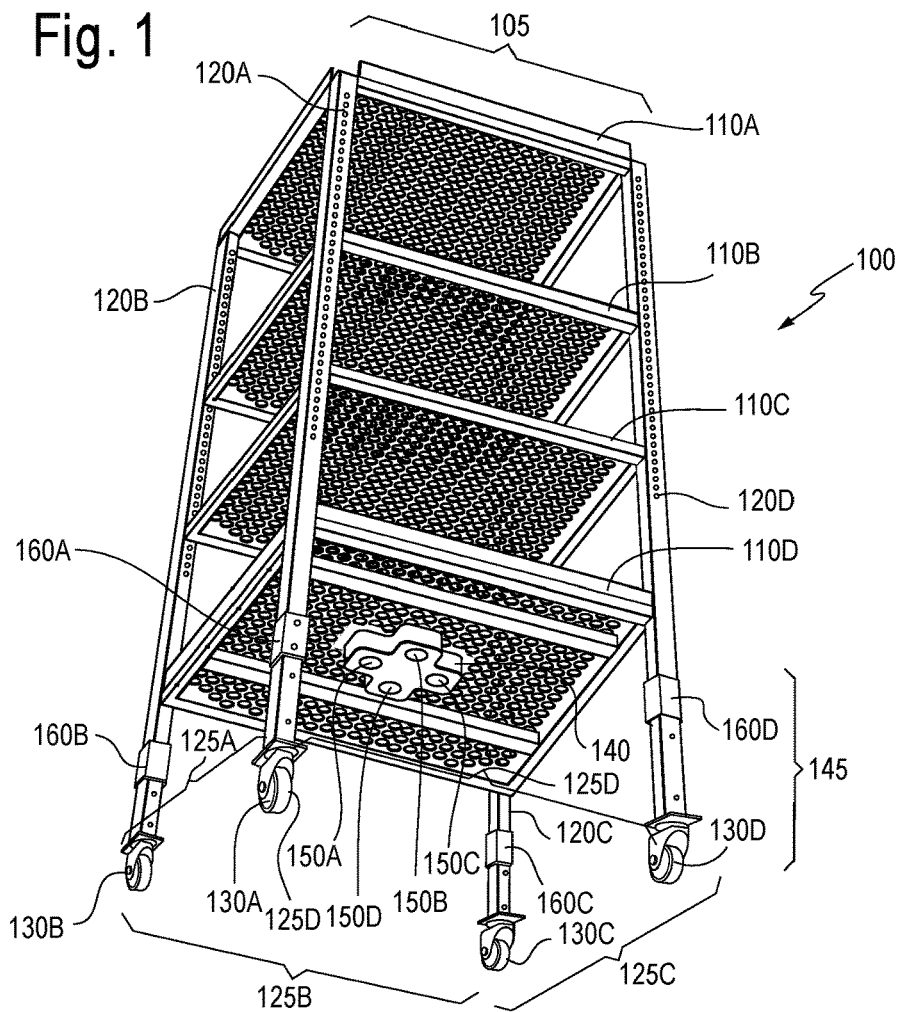
FIG. 1 is a side perspective drawing of a square robotic cart.

FIG. 1 is a side perspective drawing of a robotic cart 100. Optionally, and as depicted, but not necessarily, the cart 100 is substantially square. For example, the cart 100 has sides 105 having a length of approximately two feet. For example, the cart 100 has sides 105 having a length of approximately one meter. In order to fit under the cart 100, a robot (not shown in this figure) docking with the cart 100 has one or more of a width and a length smaller than the first distance 125A. Preferably, the robot has both a width smaller than the first distance 125A and a length smaller than the first distance 125A. In order to fit under the cart 100, the robot (not shown in this figure) docking with the cart 100 has one or more of a width and a length smaller than the second distance 125B. Preferably, the robot has both a width smaller than the second distance 125B and a length smaller than the second distance 125B.

The robotic cart 100 comprises at least one shelf 110A-110D for use in holding a payload (not shown) transported on the cart 100. As depicted, but not necessarily, the cart 100 comprises four shelves 110A-110D. Preferably, though not necessarily, at least one of the shelves 110A-110D is substantially square. For example, though not necessarily, the shelves 110A-110D are all substantially square. The shelves 110A-110D comprise a surface configured to do one or more of supporting and containing the payload. Alternatively, or additionally, the shelves comprise a container configured to do one or more of support and containing the payload. As depicted, the shelves 110A-110D comprise substantially flat shelves. For example, at least one of the shelves 110A-110D has a lip around the edge to prevent the payload from slipping off the cart 100 during motion. As depicted, each of the shelves 110A-110D has a lip around the edge to prevent the payload from slipping off the cart 100 during motion. The shelves 110A-110D can be attached to the cart 100. For example, the shelves 110A-110D can be permanently attached to the cart 100. For example, the shelves 110A-110D can be one or more of glued, stapled, bolted and nailed to the cart 100. Alternatively, or additionally, the shelves 110A-110D can be removably attached to the cart 100.

The robotic cart 100 further comprises a plurality of legs 120A-120D. As depicted, the robotic cart 100 comprises four legs 120A-120D. The legs 120A-120D of the cart 100 can be attached to the shelves 110A-110D. For example, the legs 120A-120D of the cart 100 can be permanently attached to the shelves 110A-110D. Alternatively, or additionally, the legs 120A-120D can be removably attached to at least one of the shelves 110A-110D. Alternatively, or additionally, the legs 120A-120D can be attached to the cart 100. For example, the legs 120A-120D can be permanently attached to the cart 100. For example, the legs 120A-120D can be one or more of glued, stapled, bolted and nailed to the cart 100. Alternatively, or additionally, the legs 120A-120D can be removably attached to the cart 100. A first distance 125A runs from the first leg 120A to the second leg 120B. Similarly a second distance 125B runs from the second leg 120B to the third leg 120C. Again, a third distance 125C runs from the third leg 120A to the fourth leg 120D. Again, a fourth distance 125D runs from the fourth leg 120D to the first leg 120A.

In order to fit around the robot (not shown in this figure), a cart 100 docking with the robot has a first distance 125A larger than one or more of a width of the robot and a length of the robot. Preferably, the cart 100 docking with the robot has a first distance 125A larger than both the width of the robot and the length of the robot. In order to fit around the robot (not shown in this figure), a cart 100 docking with the robot has a second distance 125B larger than one or more of the width of the robot and the length of the robot. Preferably, the cart 100 docking with the robot has a second distance 125B larger than both the width of the robot and the length of the robot.

At least one of the legs 120A-120D comprises a wheel 130A-130D. The first leg 120A comprises the first wheel 130A, and so on. The wheels 130A-130D can be attached to the cart 100. For example, the wheels 130A-130D can be permanently attached to the cart 100. For example, the wheels 130A-130D can be one or more of glued, stapled, bolted and nailed to the cart 100. Alternatively, or additionally, the wheels 130A-130D can be removably attached to the cart 100.

As depicted, all four of the legs 120A-120D comprise a corresponding wheel 130A-130D. As depicted, the wheels 130A-130D are located at a bottom of the respective legs 120A-120D. As depicted, the wheels 130A-130D are configured to roll to facilitate movement of the cart 100.

Alternatively or additionally, the legs 120A-120D can be attached to a frame (not pictured) from which the shelves 110A-110D can be removed. For example, at least one shelf 110A-110D can comprise one or more of a tote and a bin. In this case, a human worker can load the cart 100 as usual. Alternatively, or additionally, the human can detach the tote from the cart 100 and load the tote before putting the tote back on the cart 100. Alternatively, or additionally, the human can pick the tote from one or more of a facility, a shelf, a conveyor, and the like. The human can then load the tote onto the cart 100. Then the human can request the robot to pick up the cart 100 as usual. According to this set of embodiments, the robotic dock need not be attached to a shelf 110A-110D.

The bottom shelf 110D further comprises a robotic dock 140. Alternatively, or additionally, the cart 100 comprises the robotic dock 140. The robotic dock 140 has a robotic dock height 145. For example, the robotic dock height 145 is configured to approximately match a docking module height of a docking module of the robot (not shown in FIG. 1).

For example, the robotic dock 140 can be permanently attached to the bottom shelf 110D. For example, the robotic dock 140 can be permanently attached to a bottom side of the bottom shelf 110D. For example, the robotic dock 140 can be one or more of glued, stapled, bolted and nailed to the bottom shelf 110D. Alternatively, or additionally, the robotic dock 140 can be removably attached to the bottom shelf 110D. For example, the bottom shelf 110D has a height greater than a height of the robot (not shown in this figure). In the case of the set of embodiments in which at least one of the shelves 110A-110D comprises one or more of a tote and a bin, the robotic dock is attached to the one or more of a tote and a bin.

The robotic dock 140 comprises a plurality of docking receptacles 150A-150D. As depicted, the robotic dock 140 comprises four docking receptacles 150A-150D. As depicted in more detail in FIG. 4B, the robotic dock 140 is configured to dock with a robot (not shown in this figure) using one or more of the docking receptacles 150A-150D.

Optionally, the robotic cart 100 further comprises one or more bands 160A-160D. As depicted, the robotic cart 100 comprises four legs 120A-120D. The bands 160A-160D can be attached to the corresponding legs 120A-120D. For example, the bands 160A-160D can be permanently attached to the corresponding legs 120A-120D. For example, the bands 160A-160D can be one or more of glued, stapled, bolted and nailed to the corresponding legs 120A-120D. Alternatively, or additionally, the bands 160A-160D can be removably attached to the corresponding legs 120A-120D.

A leg 120A-120D, for example, the first leg 120A, can be distinguished from the other legs 120B-120D using the first band 160A. For example, the first leg 120A can be marked with a first band 160A having a different property from the bands 160B-160D on the other legs 120B-120D. For example, the first leg 120A may comprise a band 160A having a different infrared (IR) signal from the other bands 160B-160D on the other legs 120B-120D. For example, the robot's sensor (not shown in this figure) can detect the different IR signal. For example, the bands 160A-160D allow a user to distinguish a preferred orientation for the robot to attach to or drop off the cart 100.

Figure 2:
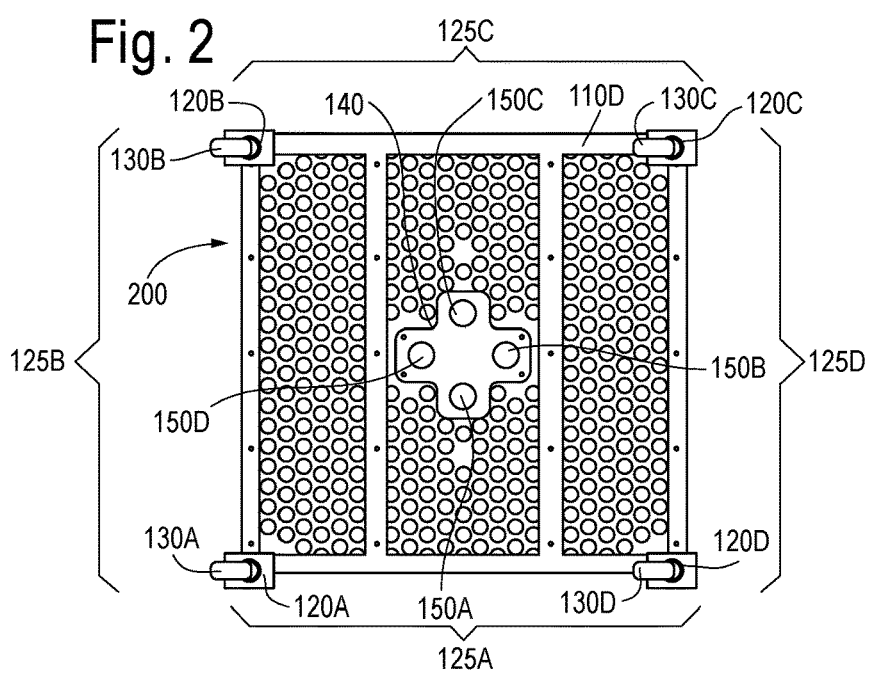
FIG. 2 is a drawing providing a bottom view of the robotic cart.

FIG. 2 is a drawing providing a bottom view 200 of the robotic cart 100. The robotic cart 100 again comprises the bottom shelf 110D (the only shelf visible in the bottom view 200), the legs 120A-120D, the wheels 130A-130D, the robotic dock 140, the docking receptacles 150A-150D, and the optional bands 160A-160D. Also shown again are the first through fourth distances 125A-125D. To attach to a cart 100, the robot 310 drives to a location in a vicinity of the cart 100, approximately facing a space between two cart legs as shown in FIG. 3.

For example, the robot 310 is symmetric about a central axis. For example, the robot has a horizontal cross section that is one or more of generally circular and generally square.

Figure 3:
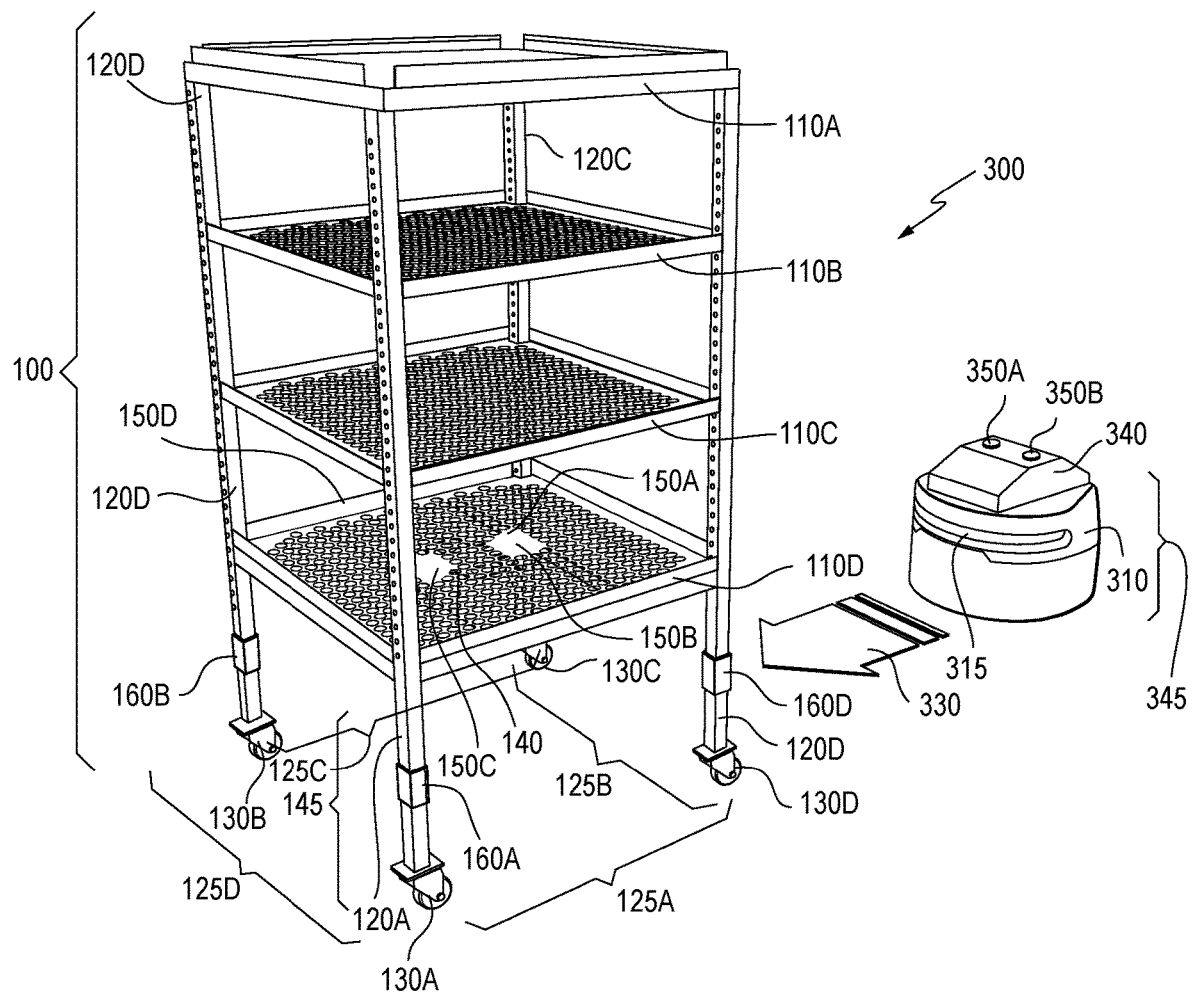
FIG. 3 is a side perspective drawing of a scene in which a robot docks with the cart.

FIG. 3 is a side perspective drawing of a scene 300 in which a robot 310 docks with the cart 100. The robotic cart 100 again comprises the shelves 110A-110D, the legs 120A-120D, the wheels 130A-130D, the robotic dock 140 having the robotic dock height 145, the docking receptacles 150A-150D, and the bands 160A-160D. Also shown again are the first through fourth distances 125A-125D. The robot 310 comprises a sensor 315. For example, the robotic sensor 315 can detect an orientation of the cart 100. For example, the robotic sensor 315 can detect an orientation of the cart 100 for purposes of arranging one or more of a pickup of the cart 100 by the robot 310 and a dropoff of the cart 100 by the robot 310. For example, as discussed above with reference to FIG. 1, the robotic sensor 315 can detect the orientation of the cart 100 using a band 160A having a different IR band from that of the other bands 160B-160D. For example, the robot comprises retractable docking pins 350A, 350B.

For example, the sensor 315 comprises one or more of a laser scanner and a three-dimensional (3D) camera. For example, the 3D camera comprises one or more of a stereo camera and a time-of-flight camera. Using the sensor 315, the robot 310 obtains data about the position of the cart 100 relative to the robot 310. Using the sensor 315, the robot 310 detects one or more of the legs 120A-120D of the cart 100.

The robot 310 then uses the detected position of the one or more legs 120A-120D to do one or more of drive itself to the cart 100, position itself under the cart 100, and align one or more of the docking pins 350A, 350B of the robot 310 with corresponding docking receptacles 150A-150D thereby securing the robot 310 to the bottom shelf 110D and thereby securing the robot 310 to the cart 100.

The robot 310 faces an opening 125A between two legs 120A and 120B of the cart 100 before driving in a direction indicated by arrow 330 under the cart 100 to connect to the cart 100. Also shown are the shelves on the cart 110A-110D, other two legs 120C and 10D, and the wheels 130A-130D. Because of a symmetrical design of one or more of the cart 100 and the robot 310, the robot 310 can connect to the cart 100 by facing, and then entering, the opening between any two adjacent legs 120A-120D.

The robot 310 further comprises a docking module 340. For example, the robotic dock height 145 is configured to approximately match a docking module height 345 of the docking module 340. The docking module 340 comprises docking pins 350A and 350B. The docking pins 350A and 350B are configured to align with corresponding docking receptacles 150A-150D, thereby securing the robot 310 to the bottom shelf 110D and thereby securing the robot 310 to the cart 100.

Figure 4B:
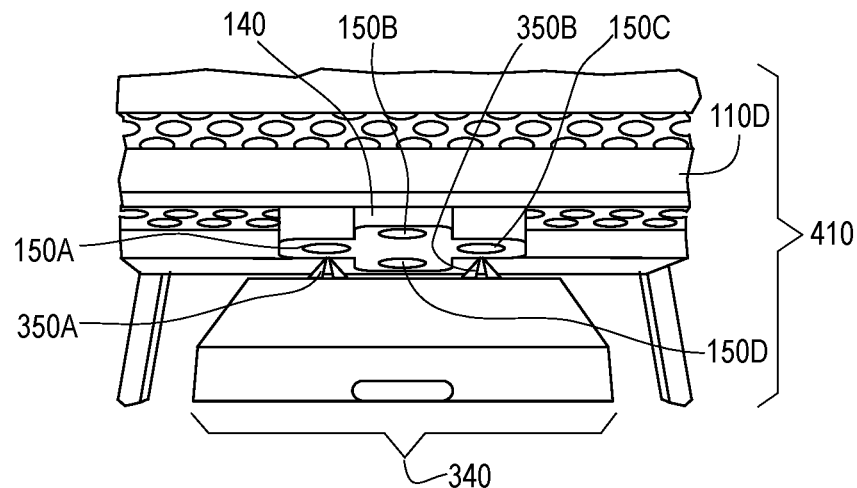
Figure 4C:
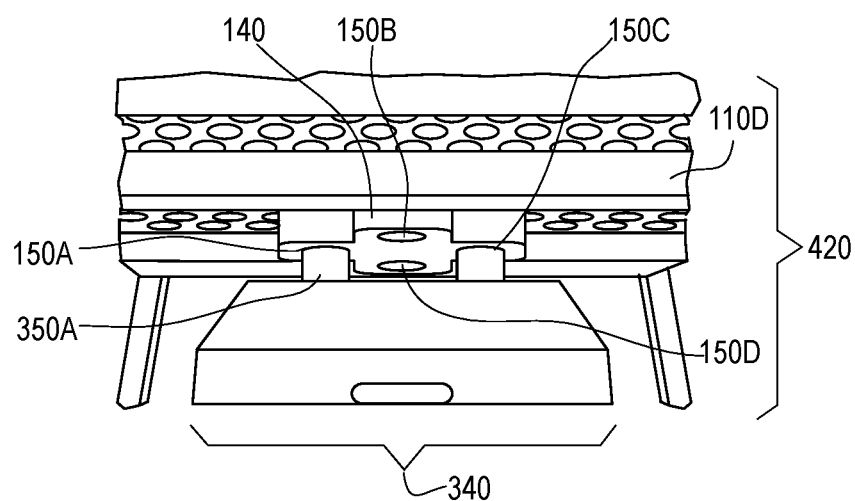
Figure 5A:
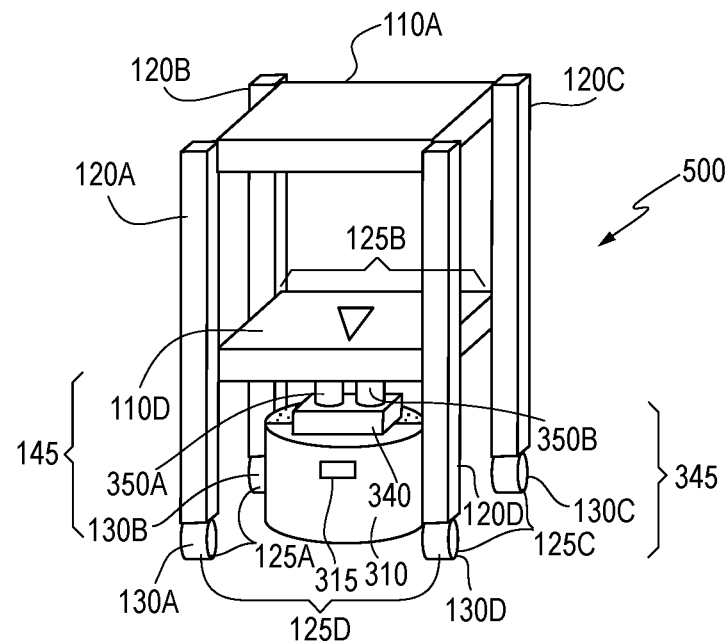
FIGS. 5A-5D are a set of drawings showing the robot docking with the cart in each of four different orientations of the robot respective to the cart.
Figure 5B:
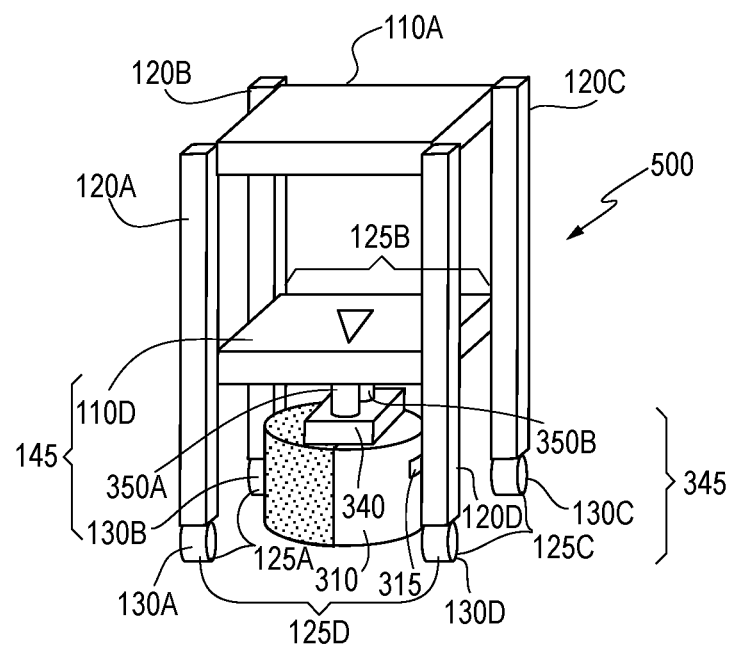
Figure 5C:
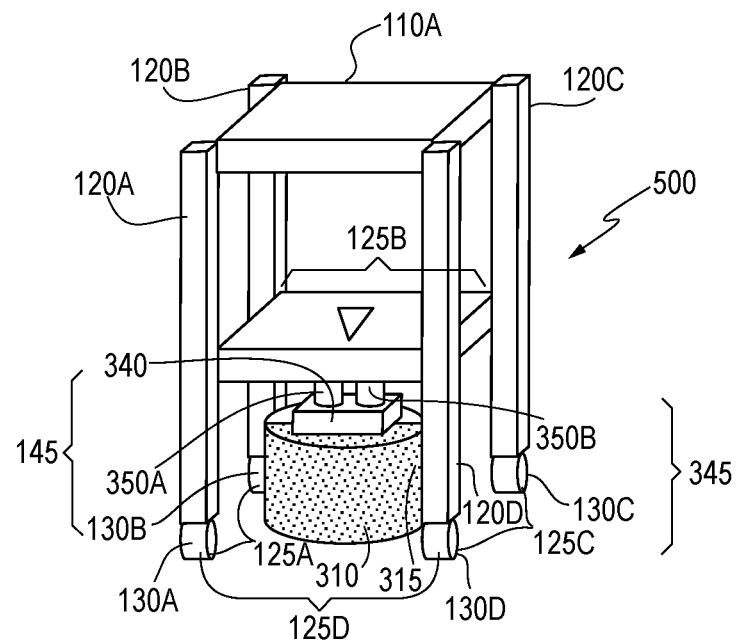
Figure 5D:
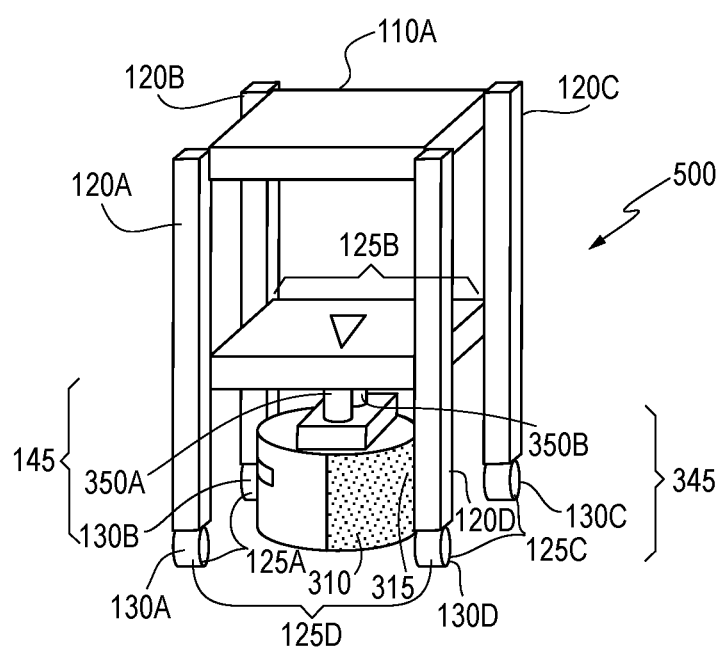

FIGS. 4A-4C are a series of drawings showing the robot 310 attaching to the cart 100 using the docking module 340 on the bottom side of the bottom shelf 110D.

FIG. 4A is a perspective drawing 400 that shows the robot 310 attaching to the cart 100 using the docking module 340 on the bottom side of the bottom shelf 110D. The robotic cart 100 again comprises the shelves 110A-110D, the legs 120A-120D, the wheels 130A-130D, the robotic dock 140 having the robotic dock height 145, the docking receptacles 150A-150D, and the bands 160A-160D. Also shown again are the first through fourth distances 125A-125D. The robot 310 again comprises the sensor 315, the docking module 340 having the docking module height 345, and the retractable docking pins 350A and 350B.

In FIG. 4A, the robot 310 aligns the docking pins 350A and 350B with corresponding docking receptacles 150A and 150B, thereby securing the robot 310 to the bottom shelf 110D and thereby securing the robot 310 to the cart 100.

FIGS. 4B-4C show detail views of the docking of the robot 310 with the cart 100. For example, the robot 310 docks with the robotic dock 140, thereby attaching the robot 310 to the cart 100, using the two docking pins 350A and 350B that insert into the respective docking receptacles 150A and 150B.

FIG. 4B shows a disengaged detail view 410 shows the docking pins 350A and 350B are shown in a disengaged position in which they are lowered relative to the robot 310. Also shown are the robotic dock 140 and the docking receptacles 150A and 150B.

FIG. 4C shows an engaged detail view 420 showing details of the robot 310 after it has docked with the robotic dock 140, inserting the docking pins 350A and 350B into the respective docking receptacles 150A and 150B. In FIG. 4C, the docking pins 350A and 350B are in an engaged position in which they are raised relative to the robot 310.

When the sensor 315 on the robot 310 detects that the robot 310 is in a proper location under the cart 100, the robot 310 raises its docking pins 350A and 350B up from the docking module 340 into an engaged position in alignment with the respective docking receptacles 150A and 150B. The robot 310 thereby secures itself to the bottom shelf 110D and thereby secures itself to the cart 100. After docking, the robot 310 attaches to the cart 100. When the robot 310 drives, the cart 100 moves with the robot 310.

FIGS. 5A-5D are a set 500 of four drawings showing the robot 310 docking with the cart 100 in each of four different orientations of the robot 310 respective to the cart 100. The robotic cart 100 again comprises the shelves 110A-110D, the legs 120A-120D, the wheels 130A-130D, and the robotic dock 140 having the robotic dock height 145. Also shown again are the first through fourth distances 125A-125D. Not visible in these figures are the optional bands. The robot 310 again comprises the sensor 315, the docking module 340 having the docking module height 345, and the retractable docking pins 350A and 350B.

Because of the respective shapes of the docking module 340 and the docking pins 350A and 350B on the robot 310, the robot 310 can dock with the cart 100 in any of four orientations as shown in FIGS. 5A-5D. For example, the robot 310 can dock with the cart 100 in a tight space in any of the four orientations shown in FIGS. 5A-5D. A tight space is defined as a space having a dimension (not shown in this figure; shown in FIGS. 6A-6E, 7A-7F, and 9A-9G) less than approximately 1.5 times a length 105 of a cart side. For example, if the length of the cart side 105 is approximately 2 feet, a space is defined as tight if, as shown the dimension (not shown in this figure; shown in FIGS. 6A-6E, 7A-7F, and 9A-9G) is less than approximately 3 feet.

When the sensor 315 on the robot 310 detects that the robot 310 is in a proper location under the cart 100, the robot 310 raises its docking pins 350A and 350B up from the docking module 340 into an engaged position in alignment with the docking receptacles (not shown in this drawing). In FIGS. 5A-5D, the cart 100 stays in the same orientation and the robot 310 is shown connecting to the cart 100 in each of four orthogonal configurations.

FIGS. 6A-6E are a series 600 of five drawings showing how the robot 310 can navigate while moving the cart 100 by detaching from and then reattaching to the cart 100. For example, the robot 310 can navigate out of a tight space such as a hallway 610 while moving the cart 100 by detaching from and then reattaching to the cart 100. One or more of the cart 100 and the robot 310 are configured so that the robot 310 can disengage from the cart 100, turn, and then re-engage with the cart 100. That is, the robot 310 can turn without having to rotate the cart 100 in order to point its sensor in a new direction of travel. The robot again comprises the sensor (not shown in these figures), the docking module 340, and the retractable docking pins 350A and 350B.

The cart 100 comprises sides 105. A tight space is defined as a space having a dimension 615 less than approximately 1.5 times a length 105 of a cart side. For example, if the length of the cart side 105 is approximately 2 feet, a space is defined as tight if, as shown the dimension 615 is less than approximately 3 feet.

Figure 6A:
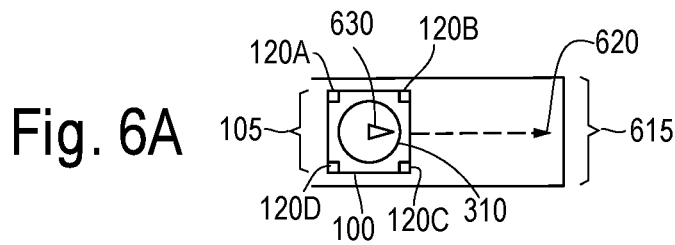
FIGS. 6A-6E are a series of drawings showing how the robot can navigate while moving the cart by detaching from and then reattaching to the cart.

In FIG. 6A, while attached to the cart 100, the robot 310 drives to the end of the hallway 610. The hallway 610 is bounded by a hallway wall 620. Also shown are the legs 120A-120D. The arrow 630 does not represent a physical feature but indicates a current direction of travel of the robot 310 to the right, toward the end of the hallway 610.

Figure 6B:
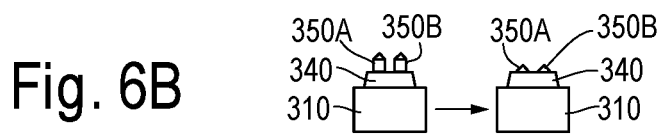

In FIG. 6B, when the sensor (not shown in this figure) on the robot 310 detects that the robot 310 is in a proper location under the cart 100, the robot 310 lowers the docking pins 350A and 350B down into the docking module 340 and away from the docking receptacles (not shown in this figure) of the robotic dock (not shown in this figure). The robot 310 thereby detaches from the cart (not shown in this figure).

Figure 6C:
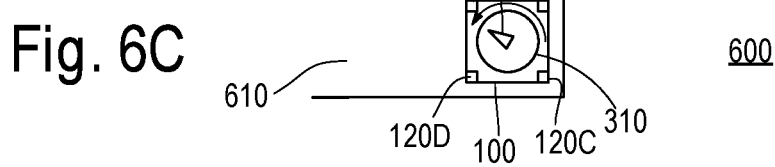

In FIG. 6C, the robot 310, now detached from the cart 100, rotates counterclockwise 180 degrees under the cart 100. The arrow 630 indicates a point near completion of a counterclockwise 180 degree rotation of the current direction of travel of the robot 310.

Shown again are the legs 120A-120D, the hallway 610, and the hallway wall 620. The positions of the cart legs 120A-120D remain the same as the robot 310 turns as the robot 310 is detached from the cart 100.

Figure 6D:
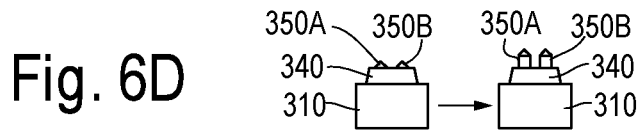

In FIG. 6D, when the sensor (not shown in this figure) on the robot 310 detects that the robot 310 is in a proper location under the cart 100, the robot 310 raises the docking pins 350A and 350B up from the docking module 340 toward the cart 100 and into alignment with the docking receptacles (not shown in this figure). The robot 310 thereby reattaches to the cart (not shown in this figure).

Because of the shape of the docking module 340 on the cart 100, the robot 310 is able to insert the docking pins 350A and 350B into receptacles (not shown in this figure) 180 degrees away from the receptacles with which the docking pins 350A and 350B were previously docked. The robot 310 is thus able to dock with the cart 100 in a position at a 180 degree angle to its previous docked position shown in FIG. 7C.

Figure 6E:
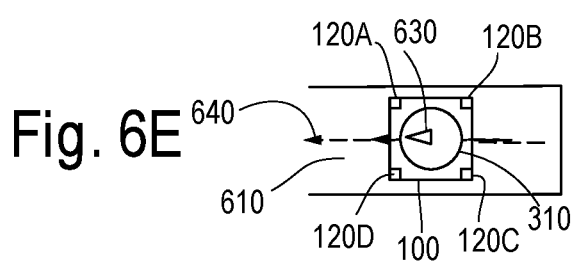

In FIG. 6E, the robot 310, now attached again to the cart 100, drives in a direction 640 straight out of the hallway 610 bounded by the hallway wall 620. The arrow 630 again does not represent a physical feature but indicates a current direction of travel of the robot 310 to the left, away from the end of the hallway 610. Shown again are the legs 120A-120D.

The design of the robot 310 and the cart 100 allow the robot 310 with the cart 100 attached to navigate efficiently out of a tight space. For safety reasons, the robot 310 may need to turn around to point its sensor (not shown in this figure) in the direction 630 of its travel. However, the robot 310 does not need to rotate the whole cart 100 180 degrees to turn itself around.

FIGS. 7A-7F are a series 700 of six drawings showing how the robot 310 can make a 90-degree turn 710 while moving the cart 100 by detaching from the cart 100, turning 90 degrees, and reattaching to the cart 100. One or more of the cart 100 and the robot 310 are configured so that the robot 310 can disengage from the cart 100, turn, and then re-engage with the cart 100. That is, the robot 310 can make the 90-degree turn 710 without having to rotate the cart 100 in order to point its sensor in a new direction of travel. For example, the 90-degree turn 710 comprises a tight 90-degree turn. The robot 310 again comprises the docking module (not shown in this figure; item 340 in FIGS. 7C and 7E). The robot 310 again comprises the retractable docking pins (not shown in this figure; items 350A and 350B in FIGS. 7C and 7E).

A tight turn 710 is defined as a turn having a dimension 715 less than approximately 1.5 times a length 105 of a cart side. For example, if the length of the cart side 105 is approximately 2 feet, a space is defined as tight if, as shown the dimension 715 is less than approximately 3 feet.

Figure 7A:
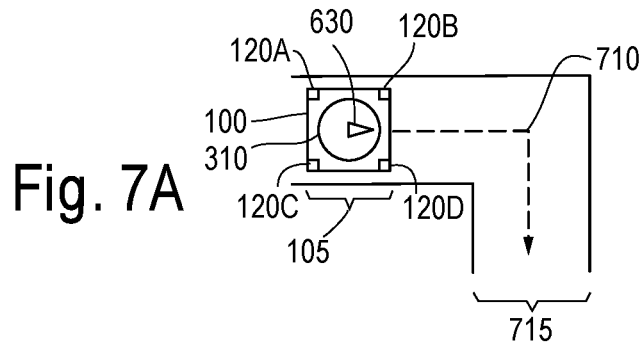
FIGS. 7A-7F are a series of drawings showing how the robot can negotiate a 90-degree turn while moving the cart by detaching from the cart, turning 90 degrees, and reattaching to the cart.

In FIG. 7A, while attached to the cart 100, the robot 310 approaches the 90-degree turn 710. Also shown are the legs 120A-120D. The arrow 630 again does not represent a physical feature but indicates a current direction of travel of the robot 310 to the right, toward the 90-degree turn 710.

Figure 7B:
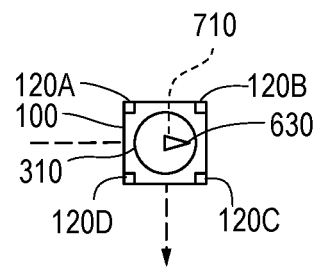

In FIG. 7B, while attached to the cart 100, the robot 310 reaches the point 710 at which it needs to turn. The arrow 630 indicates a current direction of travel of the robot 310 to the right, toward the 90-degree turn 710 at which the robot 310 has just arrived. Also shown again are the legs 120A-120D.

Figure 7C:
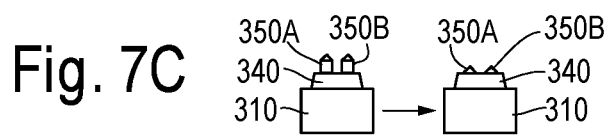

In FIG. 7C, when the sensor (not shown in this figure) on the robot 310 detects that the robot 310 is in a proper location under the cart 100, the robot 310 lowers the retractable docking pins 350A and 350B down into the docking module 340 and away from the docking receptacles (not shown in this figure) of the robotic dock (not shown in this figure). The robot 310 thereby detaches from the cart (not shown in this figure).

Figure 7D:
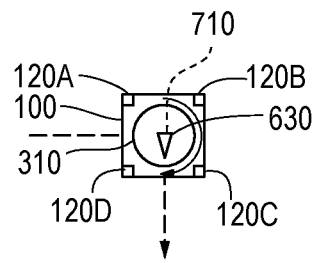

In FIG. 7D, the robot 310, now detached from the cart 100, rotates clockwise 90 degrees under the cart 100. Following completion of the 90 degree rotation, the robot 310 drives in a direction 720. The arrow 630 indicates a current direction of travel of the robot 310 to the bottom of the page, away from the 90 degree turn 710, although the robot 310 has not yet re-attached to the cart 100 so the robot 310 is not yet ready to move in the direction indicated by the arrow 630. Shown again are the legs 120A-120D. The positions of the cart legs 120A-120D remain the same as the robot 310 turns as the robot 310 is detached from the cart 100.

Figure 7E:
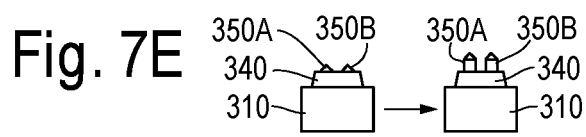

In FIG. 7E, when the sensor (not shown in this figure) on the robot 310 detects that the robot 310 is in a proper location under the cart 100, the robot 310 raises its docking pins 350A and 350B up from the docking module 340 toward the cart (not shown in this figure) and into alignment with the docking receptacles (not shown in this figure). The robot 310 thereby reattaches to the cart (not shown in this figure).

Because of the shape of the docking module 340 on the cart 100, the robot 310 is able to insert the docking pins 350A and 350B into receptacles (not shown in this figure) 90 degrees away from the receptacles with which the docking pins 350A and 350B were previously docked. The robot 310 is thus able to dock with the cart 100 in a position at an approximate 90 degree angle to its previous docked position shown in FIG. 7C.

Figure 7F:
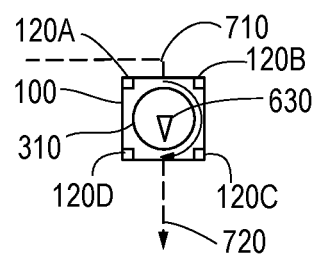

In FIG. 7F, the robot 310, now attached again to the cart 100, drives in the direction 720 straight out away from the point 710. The arrow 630 indicates the current direction of travel of the robot 310 to the bottom of the page, away from the 90 degree turn 710. Shown again are the legs 120A-120D.

The design of the robot 310 and the cart 100 again allow the robot 310 with the cart 100 attached to navigate efficiently out of tight spaces. For safety reasons, the robot 310 may need to turn around to point its sensor (not shown in this figure) in the direction 720 of its travel.

Again the robot 310 does not need to rotate the whole cart 100 90 degrees to turn itself around.

FIGS. 8A-8F are a series 800 of six drawings showing how the robot 310 can safely navigate away from another obstacle, for example, a forklift 810, while moving the cart 100 by detaching from and then reattaching to the cart 100. One or more of the cart 100 and the robot 310 are configured so that the robot 310 can disengage from the cart 100, turn, and then re-engage with the cart 100. That is, the robot 310 can turn without having to rotate the cart 100 in order to point its sensor in a new direction of travel. The robot 310 again comprises the docking module 340. The robot 310 again comprises the retractable docking pins 350A and 350B.

Figure 8A:
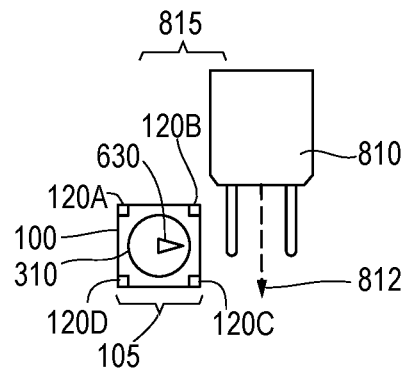
FIGS. 8A-8F are a series of drawings showing how the robot can safely navigate away from an obstacle while moving the cart by detaching from and then reattaching to the cart.

In FIG. 8A, while attached to the cart 100, the robot 310 drives in a current direction of travel represented by the arrow 630. A forklift 810 suddenly appears directly ahead of the robot as an unexpected obstacle. Also shown are the legs 120A-120D. The forklift is moving in a forklift direction 812. The forklift 810 comes to a stop very close to the cart 100, at a distance 815 from the cart. For example, the distance 815 comprises a tight distance. A tight distance 815 is defined as a distance less than approximately 1.5 times a length 105 of a cart side. For example, if the length of the cart side 105 is approximately 2 feet, a distance is defined as tight if, as shown the dimension 815 is less than approximately 3 feet.

The tight distance 815 means that the robot 310 would not be able to turn around while carrying the cart 100.

Figure 8B:
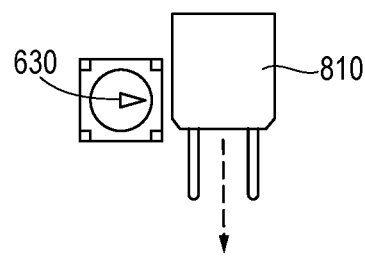

In FIG. 8B, the robot 310 comes to a stop near the forklift 810. Alternatively, or additionally, the forklift 810 comes to a stop near the robot 310. The robot 310 is so close to the forklift 810 that the robot 310 cannot turn in place without the cart 100 colliding with the forklift 810.

Figure 8C:
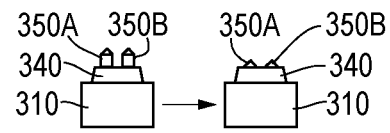

As shown in FIG. 8C, when the sensor (not shown in this figure) on the robot 310 detects that the robot 310 is in a proper location under the cart 100, the robot 310 lowers the docking pins 350A and 350B down into the docking module 340 and away from the docking receptacles (not shown in this figure) of the robotic dock (not shown in this figure). The robot 310 thereby detaches from the cart (not shown in this figure).

Figure 8D:
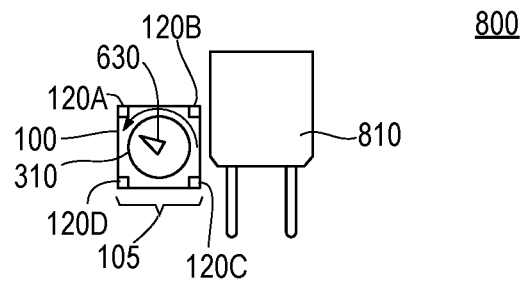

In FIG. 8D, the robot 310, now detached from the cart 100, rotates counterclockwise 180 degrees under the cart 100. The arrow 630 indicates a counterclockwise 180 degree rotation of the current direction of travel of the robot 310.

Shown again are the legs 120A-120D and the forklift 810. The positions of the cart legs 120A-120D remain the same as the robot 310 turns as the robot 310 is detached from the cart 100.

Figure 8E:
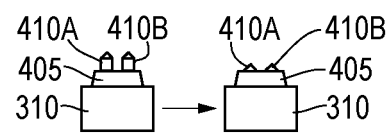

In FIG. 8E, when the sensor (not shown in this figure) on the robot 310 detects that the robot 310 is in a proper location under the cart 100, the robot 310 raises the docking pins 350A and 350B up from the docking module 340 toward the cart (not shown in this figure) and toward the docking receptacles (not shown in this figure). The robot 310 thereby reattaches to the cart (not shown in this figure).

Because of the shape of the docking module 340 on the cart 100, the robot 310 is able to insert the docking pins 350A and 350B into receptacles (not shown in this figure) 180 degrees away from the receptacles with which the docking pins 350A and 350B were previously docked. The robot 310 is thus able to dock with the cart 100 in a position at a 180 degree angle to its previous docked position shown in FIG. 8C.

Figure 8F:
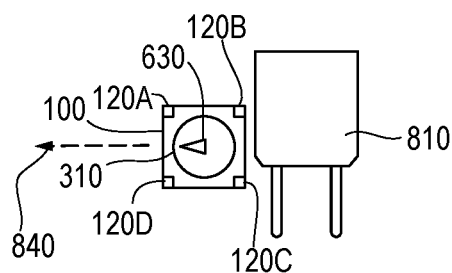

In FIG. 8F, the robot 310, now attached again to the cart 100, drives in a direction 840 away from the forklift 810.

The arrow 630 again does not represent a physical feature but indicates a current direction of travel of the robot 310 to the left, away from the forklift 810. Shown again are the legs 120A-120D.

The design of the robot 310 and the cart 100 allow the robot 310 with the cart 100 attached to navigate efficiently out of tight spaces. For safety reasons, the robot 310 may need to turn around to point its sensor (not shown in this figure) in the direction 630 of its travel. However, the robot 310 does not need to rotate the whole cart 100 180 degrees to turn itself around.

Robots are also able to drive under a line of carts, enabling an efficient workflow involving a cart dropoff or a cart pickup.

FIGS. 9A-9G are a series 900 of seven drawings showing an example of a robot driving under a line of carts 100A-100C. One or more of the cart 100 and a first robot 310A are configured so that the first robot 310A disengages from a cart 100D that it is carrying and then travels under a line of carts 100A-100C. The first robot 310A again comprises a first docking module 340A. The first robot 310A again comprises retractable docking pins 350A, 350B (visible in FIGS. 9E and 9G).

For example, the series of events shown in FIGS. 9A-9G may occur in a setting involving a tight space. The cart 100 comprises sides 105. A tight space is defined as a space having a dimension 905 less than approximately 1.5 times a length 105 of a cart side. In this case, the dimension 905 comprises a clearance between a first obstacle 907 and a second obstacle 908. For example, if the length of the cart side 105 is approximately 2 feet, a space is defined as tight if, as shown, as shown, the dimension 905 is less than approximately 3 feet.

Figure 9A:
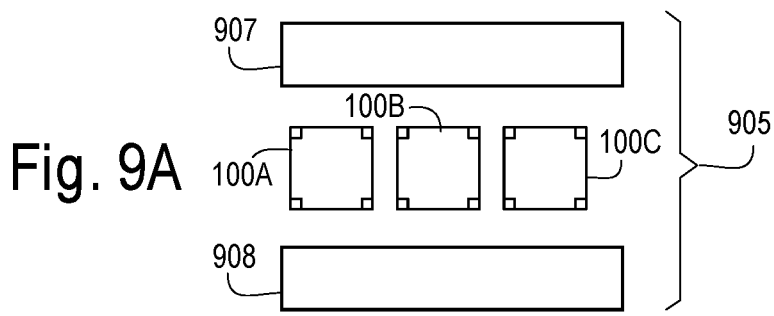
FIGS. 9A-9G are a series of drawings showing an example of efficient robotic cart transfer in which the robot drives under a line of carts.

FIG. 9A shows a line of carts 100A-100C that have already been dropped off by one or more of humans and robots.

Figure 9B:
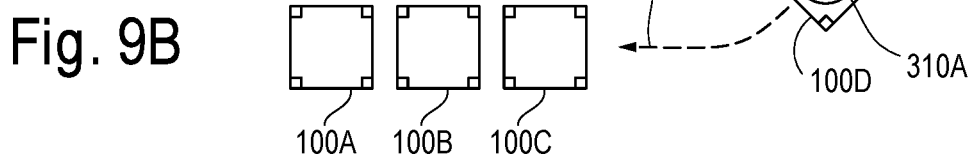

In FIG. 9B, a first robot 310A that is attached to a fourth cart 100D is driving toward the line of carts 100A-100C to drop off the fourth cart 100D. The first robot 310A drives in a direction 910. An arrow 630A indicates a current direction of travel of the first robot 310A.

Figure 9C:
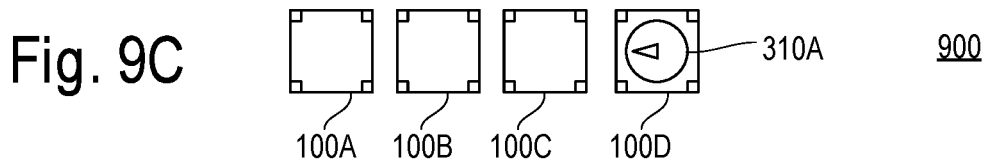

In FIG. 9C, the first robot 310A, while still attached to the fourth cart 100D, arrives at the end of the line of carts 100A-100C. The first robot 310A detaches from the fourth cart 100D. To detach from the fourth cart 100D, the first robot 310A follows a similar process to that shown above in FIGS. 6B, 7C, and 8C. That is, when the sensor (not shown in this figure) on the first robot 310A detects that the first robot 310A is in a proper location under the fourth cart 100D, the first robot 310A lowers the docking pins (not shown in this figure; visible as items 350A and 350B in FIGS. 9E and 9G) down into the first docking module (not shown in this figure; visible as item 340A in FIGS. 9E and 9G) and away from the docking receptacles (not shown in this figure) of the robotic dock (not shown in this figure). The first robot 310A thereby detaches from the fourth cart 100D.

Figure 9D:
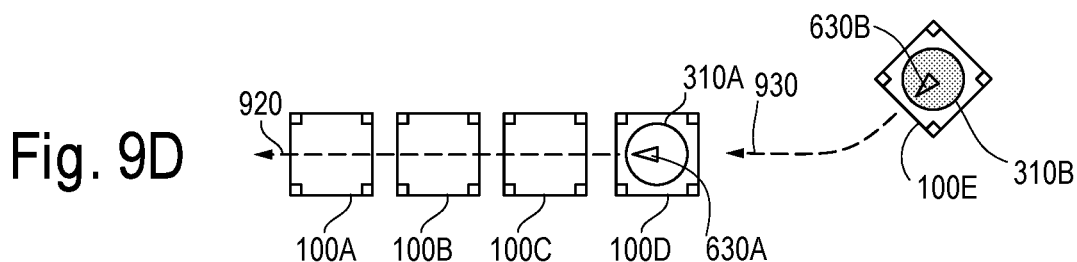

In FIG. 9D, the first robot 310A, now detached from the fourth cart 100D, drives straight under carts 100A-100C in a direction 920. The arrow 630A indicates the current direction of travel of the first robot 310A, to the left toward the cart 100A at the end of the carts 100A-100D.

A second robot 3106 that is attached to a fifth cart 100E is driving toward the line of carts 100A-100D to drop off the fifth cart 100E. The second robot 310B drives in a direction 930. An arrow 630B indicates a current direction of travel of the second robot 310B. The second robot 310B comprises a second docking module 340B. The second robot 310B again comprises retractable docking pins 350C and 350D.

Figure 9E:
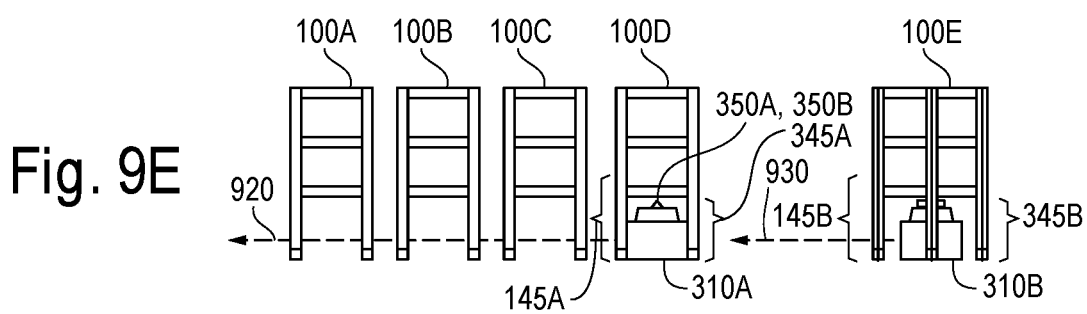

FIG. 9E shows a side view of FIG. 9D where the first robot 310A is starting to drive under the carts 100A-100C after dropping off its fourth cart 100D at the end of the line of carts 100A-100D. The fourth cart 100D has a first robotic dock 140A having a first robotic dock height 145A. The fifth cart 100E has a second robotic dock 140B having a second robotic dock height 145B.

The first robot 310A comprises a first docking module 340A having a first docking module height 345A. As the first robot 310A drives under the carts, the second robot 310B approaches to drop off its cart 100E behind the cart 100D that is dropped off by the first robot 310A.

The second robot 310B comprises a second docking module 340B having a second docking module height 345B. The second robot 310B detaches from the fifth cart 100E. To detach from the fifth cart 100E, the second robot 310B follows a similar process to that shown above in FIGS. 6B, 7C, 8C, and 9C. That is, when the sensor (not shown in this figure) on the second robot 310B detects that the second robot 310B is in a proper location under the fifth cart 100E, the second robot 310B lowers the docking pins 350C and 350D down into the second docking module 340B and away from the docking receptacles (not shown in this figure) of the robotic dock (not shown in this figure). The second robot 310B thereby detaches from the fifth cart 100E.

Figure 9F:
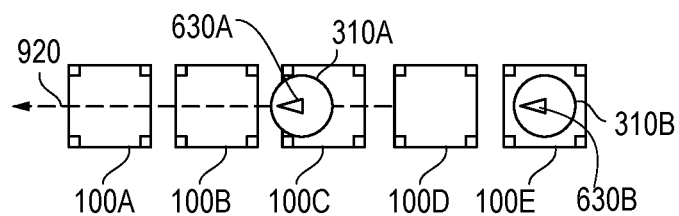

In FIG. 9F, the first robot 310A passes under the third cart 100C and continues to drive straight under the carts 100A-100C in the direction 920. The arrow 630A indicates the current direction of travel of the first robot 310A, to the left toward the cart 100A at the end of the carts 100A-100E.

The second robot 310B, now detached from the fifth cart 100E, stops. The arrow 630B indicates the current direction of travel of the second robot 310B, to the left toward the cart 100A at the end of the carts 100A-100E.

Figure 9G:
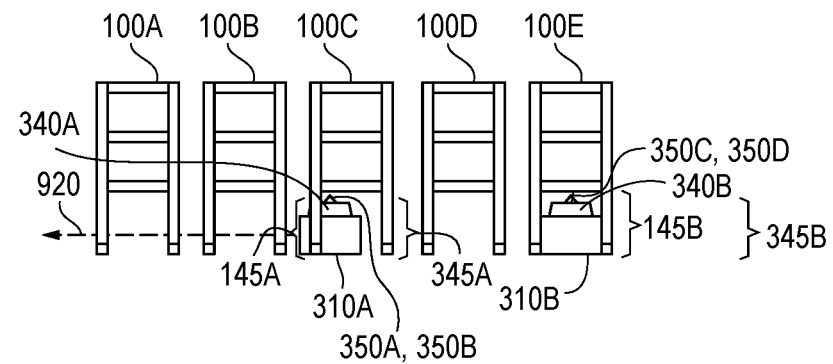

FIG. 9G shows a side view of FIG. 9F where the first robot 310A is continuing to drive under the carts 100A-100C and the second robot has stopped after dropping off its cart 100E at the end of the line of carts 100A-100D.

FIG. 10 is a flow chart of a method 1000 for efficient robotic cart transfer.

The order of the steps in the method 1000 is not constrained to that shown in FIG. 10 or described in the following discussion. Several of the steps could occur in a different order without affecting the final result.

In step 1010, a robot comprising a sensor, the robot further comprising a docking module, the docking module comprising retractable docking pins, drives in a first direction while the robot is attached to a cart, the cart comprising: four legs; at least one shelf, each shelf attached to each of the legs; four wheels, each wheel attached to a different leg at a bottom of the leg, the wheels configured to roll to facilitate movement of the cart; and a robotic dock attached to a bottom side of a bottom shelf, the robotic dock comprising four docking receptacles at ninety degree angles from adjacent docking receptacles, each docking receptacle configured to mate with a corresponding docking pin, thereby securing the robot to the cart. For example, the step of driving in the first direction comprises driving to the end of a space. Block 1010 then transfers control to block 1020.

In step 1020, the robot, using the robotic sensor, detects that the robot is in a proper location under the cart. Block 1020 then transfers control to block 1030.

In step 1030, the robot stops under the cart at the proper location. Block 1030 then transfers control to block 1040.

In step 1040, the robot lowers the docking pins down into the docking module and away from the docking receptacles of the robotic dock, thereby detaching the robot from the cart. Block 1040 then transfers control to block 1050.

In step 1050, the robot rotates under the cart to point the robot to travel in a second direction. For example, the second direction comprising an approximate reverse of the first direction. Block 1050 then transfers control to block 1060.

In step 1060, the robot raises the docking pins into an engaged position in alignment with the corresponding docking receptacles, thereby securing the robot to the bottom shelf and thereby securing the robot to the cart. Block 1060 then transfers control to block 1070.

In step 1070, the robot drives in the second direction while the robot is attached to the cart. Block 1070 then terminates the process.

FIG. 11 is a flow chart of a method 1100 for efficient robotic cart transfer.

The order of the steps in the method 1100 is not constrained to that shown in FIG. 11 or described in the following discussion. Several of the steps could occur in a different order without affecting the final result.

In step 1110, a robot comprising a sensor, the robot further comprising a docking module, the docking module comprising retractable docking pins, drives in a direction while the robot is attached to a first cart, the first cart comprising: four legs; at least one shelf, each shelf attached to each of the legs; four wheels, each wheel attached to a different leg at a bottom of the leg, the wheels configured to roll to facilitate movement of the cart; and a robotic dock attached to a bottom side of a bottom shelf, the robotic dock comprising four docking receptacles at ninety degree angles from adjacent docking receptacles, each docking receptacle configured to mate with a corresponding docking pin, thereby securing the robot to the first cart. Block 1110 then transfers control to block 1120.

In step 1120, the robot, using the robotic sensor, detects that the robot is in a proper location at an end of a line of second carts. Block 1120 then transfers control to block 1130.

In step 1130, the robot stops at the proper location. Block 1130 then transfers control to block 1140.

In step 1140, the robot lowers the docking pins down into the docking module and away from the docking receptacles of the robotic dock, thereby detaching the robot from the first cart. Block 1140 then transfers control to block 1150.

In step 1150, the robot drives forward in the direction under the line of second carts. Block 1150 then terminates the process.

An advantage of the invention is that the design of one or more of the cart and the robot allows the robot to connect to the cart by facing and entering an opening between any two adjacent legs.

An advantage of the invention is that the flexibility of the robot's ability to dock with the cart as illustrated in FIGS. 5A-5D permits workers to place the cart in a variety of orientations for robotic pickup, rather than spending time making sure the cart is in one specific orientation.

A still further advantage of embodiments of the invention is that one or more of the cart and the robot are configured to navigate efficiently out of tight space. A still further advantage of embodiments of the invention is that one or more of the cart and the robot are configured so that the robot can disengage from the cart, turn, and then re-engage with the cart. That is, the robot can turn without having to rotate the cart in order to point its sensor in a new direction of travel.

An additional advantage is that the design of one or more of the cart and the robot allows the robot to turn around without having to rotate the cart.

An advantage of the invention is that the distinguishing bands on the cart legs allow a user to designate a preferred orientation for the robot to attach to or drop off the cart.

A still further advantage of embodiments of the invention is that a robot can drive under a line of carts and thereby improve efficiency.

Another advantage of embodiments of the invention is that the ability of the robots to drive under the carts means that the robots do not need to change their trajectories to avoid each other. This has the additional advantages of keeping the flow of robot traffic to a single direction and keeping the area around the carts more clear as the robot traffic is funneled under the carts. Yet another advantage is that areas adjacent to the line of carts can be high traffic areas for humans, forklifts, and the like and robots will be able to travel in their own protected space under the carts without interfering with traffic.

It will be understood by those skilled in the art that software used by the method for automatic annotation of a map may be located in any location in which it may be accessed by the system. It will be further understood by those of skill in the art that the number of variations of the network, the location of the software, and the like are virtually limitless.

For example, the robot can, instead of rotating counterclockwise under the cart as discussed in FIGS. 6-9, instead rotate clockwise under the cart. For example, the robot could comprise docking receptacles and the cart could comprise retractable docking pins without substantially affecting the functioning of the invention.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain steps and certain components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. A system comprising:
    a cart comprising:
        a plurality of legs, at least one of the plurality of legs having an indicium disposed thereon;
        at least one shelf attached to the legs;
        a robotic dock attached to a bottom shelf of the cart; and
    a robot comprising:
        a sensor configured to recognize the indicium on the at least one leg; and
        a docking module configured to secure the robot to the bottom shelf of the cart, wherein the robot is configured to determine an orientation of the cart for at least one of docking or undocking with the robotic dock by identifying a location of the at least one leg on the cart based on the indicium.

2. The system of claim 1, wherein the robotic dock has a robotic dock height that is configured to approximately match a docking module height of the docking module.

3. The system of claim 1, wherein the at least one shelf is removably attached to the at least one leg.

4. The system of claim 1, wherein the cart comprises at least one substantially square shelf.

5. The system of claim 1, wherein the robotic dock is attached to a bottom side of a bottom shelf.

6. The system of claim 1, wherein the bottom shelf has a height greater than a height of the robot.

7. The system of claim 1, wherein the indicium includes an IR signal detectable by the sensor.

8. The system of claim 1, wherein the sensor comprises an infrared (IR) sensor.

9. The system of claim 1, wherein the robot connects to the cart by entering an opening between any two adjacent legs.

10. The system of claim 1, wherein the robot connects to the cart in each of four orthogonal configurations.

11. The system of claim 1, wherein the robot connects to the cart in each of four orthogonal configurations with the cart in a same position.

12. The system of claim 1, wherein the robot while carrying the cart is configured to change direction in a tight space, wherein a tight space is defined as a space having a dimension less than approximately 1.5 times a length of a cart side.

13. The system of claim 1, wherein one or more of the robot and the cart is configured to efficiently transfer the cart in a tight space, wherein a tight space is defined as a space having a dimension less than approximately 1.5 times a length of a cart side.

14. The system of claim 1, wherein one or more of the robot and the cart is configured so that the robot can turn around without having to rotate the cart.

15. The system of claim 1, wherein the robot can disengage from the cart, turn, and then re-engage with the cart.

16. The system of claim 1, the cart comprising four shelves.

17. The system of claim 16, wherein the cart comprises four substantially square shelves.

18. The system of claim 1, wherein the robot is symmetric about a central axis.

19. The system of claim 18, wherein the robot has a horizontal cross section that is one of generally circular and generally square.

20. A method for efficient robotic reversal of direction while carrying a cart, comprising:
by a robot comprising a sensor, driving in a first direction while the robot is attached to the cart;
by the robot, stopping and detaching the robot from the cart;
by the robot, rotating under the cart to point the robot to travel in a second direction;
by the robot, securing the robot to a bottom shelf of the cart; and
by the robot, driving in the second direction while the robot is attached to the cart,
wherein the robot is configured to determine an orientation of the cart for at least one of docking or undocking with a robotic dock of the cart by identifying a location of at least one leg on the cart based on an indicium disposed on the at least one leg.

21. The method of claim 20, the second direction comprising an approximate reverse of the first direction.

22. The method of claim 20, the second direction comprising a direction at an approximately 90 degree angle to the first direction.

23. The method of claim 20, wherein the step of driving in the first direction comprises driving to the end of a space.

24. The method of claim 20, wherein the step of driving in the first direction comprises driving to the end of a tight space, wherein a tight space is defined as a space having a dimension less than approximately 1.5 times a length of the cart side.

25. The method of claim 20, wherein the step of driving in the second direction comprises driving out of a tight space, wherein a tight space is defined as a space having a dimension less than approximately 1.5 times a length of the cart side.

26. The method of claim 20, wherein the robot is symmetric about a central axis.

27. The method of claim 20, wherein the robot has a horizontal cross section that is one of generally circular and generally square.

28. The method of claim 20, wherein the cart comprises at least one substantially square shelf.

29. The method of claim 20, wherein the cart comprises four substantially square shelves.

30. The method of claim 20, wherein the robotic dock is attached to the bottom shelf.

31. The method of claim 20, wherein the robotic dock is attached to a bottom side of the bottom shelf.

32. The method of claim 20, wherein the robot while carrying the cart is configured to change direction in a tight space, wherein a tight space is defined as a space having a dimension less than approximately 1.5 times a length of the cart side.

33. The method of claim 20, wherein one or more of the robot and the cart is configured to transfer the cart in a tight space, wherein a tight space is defined as a space having a dimension less than approximately 1.5 times a length of the cart side.

34. The method of claim 20, wherein one or more of the robot and the cart is configured so that the robot can turn around without having to rotate the cart.

35. The method of claim 20, wherein the robot can disengage from the cart, turn, and then re-engage with the cart.

36. A method in a mobile robot, the method comprising:
recognizing, by a sensor of the robot, an indicium disposed on at least one leg of a cart; and
determining an orientation of the cart for at least one of docking or undocking of the robot and the cart by identifying a location of the at least one leg on the cart based on the indicium.

37. The method of claim 36, wherein the robot comprises a docking module, the docking module having retractable docking pins, each retractable docking pin configured, when extended upward, to mate with a corresponding docking receptacle of the cart, thereby securing the robot to a bottom shelf of the cart.

38. The method of claim 36, further comprising:
driving, by the robot, in a direction while the robot is attached to a first cart;
detecting, by the robot, that the robot is in a location at an end of a line of second carts;
stopping, by the robot, at the location and detaching the robot from the first cart; and driving, by the robot in a direction passing under the line of second carts.

39. The method of claim 36, wherein the indicium includes an IR signal detectable by the sensor.

40. The method of claim 39, wherein the IR signal uniquely identifies the at least one leg of the cart.

* * * * *